United States Patent [19]
Hughes

[11] Patent Number: 5,273,383
[45] Date of Patent: Dec. 28, 1993

[54] THREADED FASTENER FOR USE IN THERMOPLASTICS AND ROLL DIE FOR PRODUCING SAME

[75] Inventor: Barry J. Hughes, Wickford, R.I.

[73] Assignee: Research Engineering & Manufacturing, Inc., Middletown, R.I.

[21] Appl. No.: 912,142

[22] Filed: Jul. 10, 1992

Related U.S. Application Data

[63] Continuation-in-part of Ser. No. 680,300, Apr. 4, 1991, Pat. No. 5,133,630.

[51] Int. Cl.⁵ .................. F16B 39/30; F16B 35/04
[52] U.S. Cl. ...................... 411/311; 411/180; 411/413; 411/424; 411/930
[58] Field of Search ............... 411/82, 180, 181, 301, 411/302, 310, 311, 411, 424, 908, 930, 413

[56] References Cited

U.S. PATENT DOCUMENTS

| | | | |
|---|---|---|---|
| 4,046,181 | 9/1977 | Barnsdale | 411/180 |
| 4,164,971 | 8/1979 | Strand | 411/301 |
| 4,508,759 | 4/1985 | Wallace | 411/301 |
| 4,941,788 | 7/1990 | Highfield | 411/180 |

FOREIGN PATENT DOCUMENTS

| | | |
|---|---|---|
| 2917934 | 11/1980 | Fed. Rep. of Germany . |
| 1279452 | 6/1972 | United Kingdom . |

*Primary Examiner*—Neill R. Wilson
*Attorney, Agent, or Firm*—Trexler, Bushnell, Giangiorgi & Blackstone, Ltd.

[57] ABSTRACT

A fastener has multiple secondary threads intertwined with a primary thread installable in a thermoplastic workpiece. A method and die are arranged for fabricating such a fastener. The fastener comprises a threaded shank portion having a primary thread of a desired form and a driver head attached thereto. At least one secondary thread is intertwined with the primary thread. In accordance with one embodiment of the invention, an outer surface of the fastener may be heated to a preselected Curie temperature during the installation of the fastener into a workpiece. The preselected Curie temperature enhances the flow of the thermoplastic material around the fastener while the fastener is being installed in the workpiece. A coating material having a particular desired Curie temperature may be applied to the fastener to produce desired driving characteristics. The heating of the fastener through Curie temperature heating reduces the drive torque and promotes plastic flow of the thermoplastic around the fastener without adversely affecting the physical characteristics of the thermoplastics material. Rolling dies having a novel rolling face are used to produce the fastener in a single rolling operation such that the formation of the primary and secondary threads can be accomplished without the one interfering with the other during formation.

13 Claims, 5 Drawing Sheets

THREADED FASTENER FOR USE IN THERMOPLASTICS AND ROLL DIE FOR PRODUCING SAME

BACKGROUND OF THE INVENTION

This application is a continuation-in-part of U.S. patent application Ser. No. 07/680,300, filed Apr. 4, 1991, now U.S. Pat. No. 5,133,630.

This invention relates to the thread-forming fastener arts and more specifically to multiple thread thread-forming fasteners formed using a pair of thread-forming roll dies.

Thermoplastics are extremely important in manufacturing because of their relatively low cost, high degree of formability, corrosion resistance, and ease of conversion from raw material to final finished product. Thermoplastics are useful in applications including automotive, medical, recreational, and disposable products. New compositions of thermoplastics are constantly being developed including materials which are reinforced with glass, carbon or other strengthening fibers. Often it is desirable to attach other structures to a body formed of thermoplastic or to attach the thermoplastic body itself to another structure.

When installing thread forming fasteners to thermoplastic materials, inherent problems of the thermoplastic materials are encountered, including a relatively high drive torque required to drive such fasteners combined with a low holding torque upon installation in such materials as well as the notch sensitivity of such materials at ambient temperatures. The combination of high drive torque and notch sensitivity results in thermoplastic materials being highly susceptible to crack formation upon the installation of thread forming fasteners. Such cracking is extremely prevalent when fastener installation is required in thin wall sections of thermoplastic material where material thickness and notch sensitivity combined with a high drive torque exacerbate crack propagation characteristics.

Attempts have been made to overcome the cracking problems and/or subsequent loosening resulting under high drive torque, low holding torque and notch sensitivity. One solution to the problem of crack propagation and thin wall sections was to apply various sealants and/or adhesives. However, many times an adhesive does not prove sufficiently reliable and may not be able to tolerate either tensile or torsional forces. Further, such measures require additional materials as well as added time and labor in installation. In automotive or other assembly operations, time and labor must be optimized, and therefore such additional steps are undesirable.

Another attempt to overcome the problems of utilizing thread-forming fasteners with thermoplastics employed drilling and threading or tapping each individual hole into which a fastener was to be applied. Such procedures are extremely expensive due to the additional time and tooling required for this additional tapping operation. Further, since the thread-tapping operation is very similar to a thread forming fastener being driven into a pilot hole, crack propagation and attendant problems still occur.

Yet another attempt to overcome the problem of fastener attachment to thermoplastics was to mold pre-threaded fastener inserts or nuts directly into the thermoplastics body. This solution is impractical in many applications because of assembly requirements which are not conducive to preassembly of inserts such as variations in attachment locations, the size or type of part to be manufactured, or the necessity to specifically locate each fastener, depending on the specific part, assembly and application. Further, even if the application was conducive to molding inserts into the thermoplastic body, such an operation can be cost prohibitive. Molding inserts into thermoplastic requires additional set up and worker time. Additionally, such operations require special equipment and tooling to accommodate the inserts.

Finally, even if the fasteners were applied to a drilled and tapped thermoplastic body or to inserts molded into the body, a fastener may to vibrate loose from the thermoplastic body since these methods may not reliably and securely retain the fastener within the thermoplastic body.

As a way of more securely retaining a fastener in a thermoplastic body, an attempt has been made to heat the fastener and then insert the fastener into the thermoplastic body. Heating of the fastener tends to melt or deform the thermoplastic body. Heating of the fastener creates a problem in that the heating of the entire fastener body tends to dissipate the heat stored therein slowly and may detrimentally alter the characteristics of the plastic which contacts the fastener. Heat energy which is retained, or sinked, in the material of the fastener will tend to dissipate slowly if the entire body is heated. High temperatures over a long period of time may locally alter the characteristics of the plastic material which contact the fastener. Altering of the plastic material characteristics in the location of the fastener may detrimentally affect the way in which the fastener is ultimately retained in the thermoplastic body.

In view of the reasons and problems presented hereinabove, it is desirable to provide a fastener for use with a thermoplastic body which will not detrimentally affect the characteristics of the thermoplastic material. Further, it is desirable to provide a fastener which will resist retrograde rotation once the fastener is installed, thereby providing better retaining characteristics.

Oestereicher, U.S. Pat. No. 2,263,137, shows a fastener having a thread and a number of projections intermediate turns of the thread. These projections are formed with an undercut shoulder facing in a direction counter to the direction of inward screwing of the fastener.

Oestereicher '137 creates a problem in the formation of such a thread such that the hyperradial face which undercuts the crest of the secondary thread is difficult if not impossible to produce using thread rolling techniques. Such a thread may be formed through casting techniques; however, such "cast" fasteners are undesirable in situations which require threads formed on a fastener using cold rolling techniques. The granular structure of the cold rolled threads, as well as the cold working, typically provides characteristics which are superior to cast fasteners.

A fastener shown in Baumle, U.S. Pat. No. 2,484,645 shows locking protrusions formed in the root parts between the thread. The article in Baumle '645 also shows side protuberances which extend between the protrusions and traverse the crest of the corresponding primary thread. The series of protuberances tend to enlarge the threads which are formed by the fastener. The protrusions are axially aligned and tend to cause a broaching action when axial tensile forces are applied to the fastener.

With further reference to Baumle, a rolling method is shown in FIG. 5. While such a rolling method may be applicable to the formation of an article as shown in Baumle, formation of multiple, helically disposed secondary threads is difficult and believed to be heretofore unknown. The problem with forming multiple helically disposed secondary threads is that a greater mismatch is created between the primary threads and the secondary threads as the threads are formed. As a result of this mismatch, the formation of the primary threads tends to obliterate or destroy the formed secondary threads. Similarly, formation of the secondary threads after the primary threads tends to destroy or deform the formed primary threads. As such, it is desirable to provide a method and device for forming multiple helically disposed secondary threads between a helical primary thread.

OBJECTS AND SUMMARY OF THE INVENTION

A general object of the present invention is to provide a fastener which has at least one secondary thread intertwined with a primary thread which resists retrograde motion, evenly distributes engaging forces, and prevents broaching.

Another object of the present invention is to provide a method of forming a fastener having a secondary thread form intertwined with a primary thread form such that the primary and secondary thread forms do not obliterate each other during the forming process.

Still another object of the present invention is to provide rolling dies which achieve the method of forming a secondary thread form intertwined with a primary thread form.

Yet another general object of the present invention is to provide a thread-forming fastener and method for installing such a fastener in a thermoplastic body which prevents crack propagation, reduces drive torque and increases holding torque.

Briefly, and in accordance with the foregoing objects, the present invention comprises a fastener having a secondary thread intertwined with a primary thread installable in a thermoplastic workpiece, as well as a method and die for fabricating such a fastener. The fastener comprises a threaded shank portion having a primary thread of a desired form and a driver head attached thereto. At least one secondary thread form is intertwined with the primary thread. Rolling dies in accordance with the invention having a novel rolling face are used to produce the fastener in a single rolling operation such that the formation of the primary and secondary threads can take place without one obliterating the other. In accordance with one embodiment of the invention, the outer skin of the fastener may be heated to a preselected Curie temperature during the installation of the fastener into a workpiece. The preselected Curie temperature enhances the flow of the thermoplastic material around the fastener while the fastener is being installed in the workpiece. A coating material having a particular desired Curie temperature may be applied to the fastener to produce desired driving characteristics. The heating of the fastener through Curie temperature heating reduces the drive torque and promotes plastic flow of the thermoplastic around the fastener without adversely affecting the physical characteristics of the thermoplastics material. Rolling dies having a novel rolling face are used to produce the fastener in a single rolling operation such that the formation of the primary and secondary threads do not obliterate each other.

BRIEF DESCRIPTION OF THE DRAWINGS

The organization and manner of the operation of the invention, together with the objects and advantages thereof, may be understood best by reference to the following description taken in connection with the accompanying drawings wherein like reference numerals identify like elements in which.

DETAILED DESCRIPTION OF THE ILLUSTRATED EMBODIMENT

While this invention may be susceptible to embodiment in different forms, the drawings illustrate specific embodiments which will be described herein in greater detail with the understanding that the present disclosure is to be considered an exemplification of the principles of the invention and is not intended to limit the invention to that which is illustrated.

Figure 1:
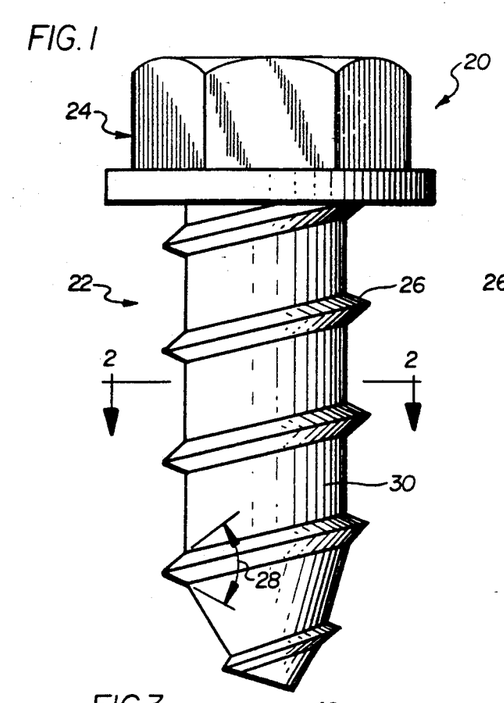
FIG. 1 is a side elevation view of a fastener having a head portion and a threaded shank portion, in accordance with one embodiment of the invention.

Referring now to the drawings wherein like elements are designated by the same numerals throughout the FIGURES, a thread-forming fastener 20 is shown in FIG. 1. The thread-forming fastener 20 is intended for use with a workpiece constructed of thermoplastic material. The fastener 20 is formed with a threaded shank portion 22 and a driver head portion 24. A spaced apart thread 26 is formed on the shank portion 22. A crest angle 28 of substantially on the order of from 30° to 60° is defined by the thread 26. An unthreaded surface portion 30 is defined in the area between the spaced apart thread 26, (i.e., running adjacent the thread 26) at substantially a root diameter 32 (see also, FIG. 2) of the thread 26.

Figure 2:
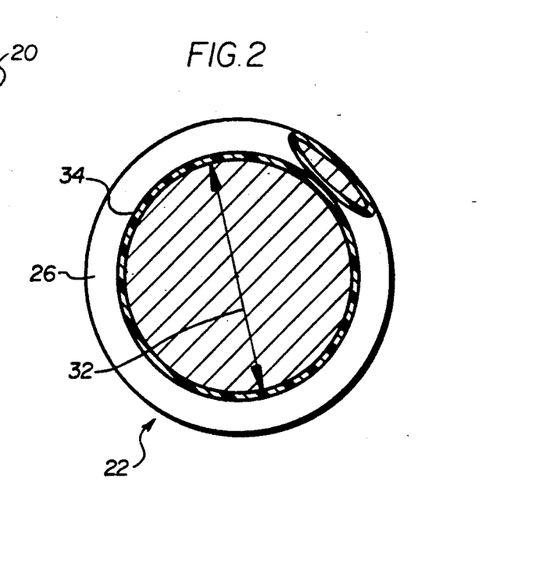
FIG. 2 is a cross-sectional view of the fastener taken along line 2—2 in FIG. 1 further illustrating a coating applied to the outer surface of the threaded shank.

As shown in the cross-section of FIG. 2 taken along line 2—2 in FIG. 1, a coating 34 of a predetermined composition is applied to the threaded shank portion 22. The coating 34 is a material of a predetermined composition which is selected for a resultant heating effect when energy is applied thereto. The thickness of the coating is based on the desired heating effect to be achieved and the type of material used. The coating 34 can be applied to the thread forming fastener 20 through any method which results in a thin surface coating, however, plating is a method which is employed in the preferred embodiment. Energy may be applied to the surface coating 34 in any suitable form, including but not limited to RF, ultrasonic and selected frequency AC induction.

When a suitable amount and form of energy is applied to the thread-forming fastener 20 to obtain a suitably elevated temperature of coating 34, the thermoplastic material of the workpiece with which it comes in contact will tend to plastically flow around the features of the threaded shank portion 22 due to the increased energy level and molecular excitation. Since the energy is applied only to the surface coating 34, the entire fastener 20 does not act as a heat sink retaining energy. Therefore, once the energy applied to the threaded fastener 20 is removed, the plastic flow ceases and the thermoplastic material tends to set up very rapidly. Dissipation of energy is enhanced since the thermoplastic material typically dissipates energy more quickly than the coating material 34 used on the thread-forming fastener 20.

The coating material 34 used in forming the thread-forming fastener 20 is specifically adapted for a particular type of thermoplastic material or a range of thermoplastic materials, and certain characteristics of the thermoplastic material such as hardness. The coating material 34 is preferably a metallic alloy which is selected to achieve a desired energization characteristic which is related to the thermoplastic material to be energized. Goals of the present invention include reducing the driving torque, increasing the plastic flow of the thermoplastic material around the threads 26 and to relieving residual stresses in the workpiece once the fastener 20 is inserted therein. The present invention achieves these goals and additionally provides a fastener which is securely locked into the workpiece until and unless a sufficient removal force is deliberately applied thereto.

The present invention is applicable to those grades of thermoplastics which because of chemistry and/or reinforcement are extremely hard, tough and non-ductile at ambient temperatures. These factors contribute to cracking and checking, because of the notch sensitivity of the thermoplastic materials at ambient temperatures. The present invention overcomes these problems as described herein.

Figure 3:
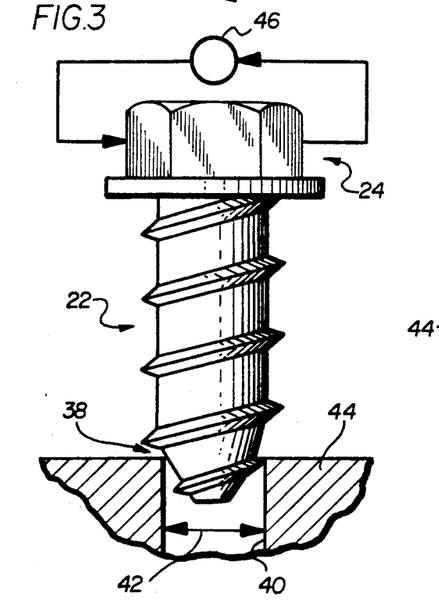
FIG. 3 is a side elevation view, in partial section, a fastener configured as in FIG. 1 positioned for installation in a pilot hole formed in a thermoplastic workpiece with energy to be applied to the fastener being indicated diagrammatically.
Figure 4:
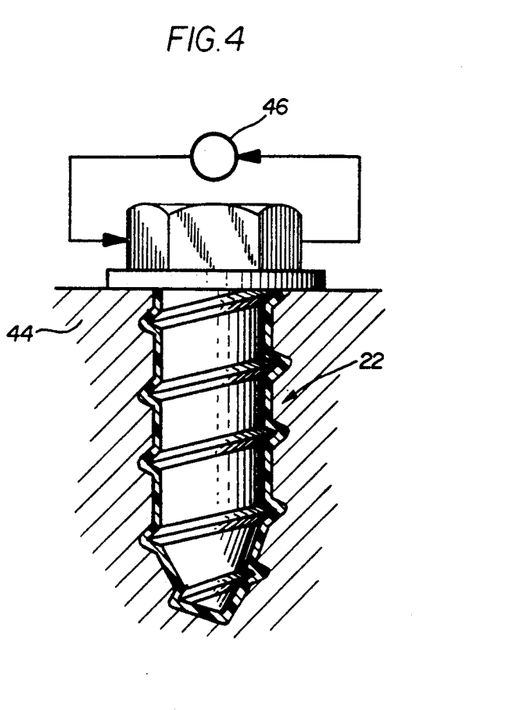
FIG. 4 is a side view of a fastener and workpiece of FIG. 3 in which the fastener has been installed in the workpiece and the thermoplastic material has flowed around the threaded shank of the fastener.

As illustrated in FIG. 3 the fastener 20 is positioned so that at least a lead-in portion 38 of the fastener 20 is positioned in a pilot hole 40 of a predetermined diameter 42 in a thermoplastic workpiece 44. Energy is applied to the fastener 20 either through conduction or induction. An energy source 46 as illustrated in FIGS. 3 and 4 is intended to diagrammatically represent any suitable form of energy to be applied to the fastener 20 and is not limited to alternating current type energy sources. The energy source 46 is activated to apply energy to the fastener 20 to cause heating of the surface coating 34. Once the energy source 46 is activated, the fastener 20 is rotated to drive the threaded shank portion 22 into the pilot hole 40 forming threads therein. Since the surface coating 34 of the fastener 20 is energized by the energy source 46, energy is transferred to the thermoplastic material of the workpiece 44 which plastically flows around the fastener 20 engaging the threads 26 formed thereon.

The method of applying energy to the fastener 20 includes applying electromagnetic energy at a predetermined frequency which is related to given properties of the surface coating 34. Energy transfer to the fastener causes heating of the surface coating 34 to a predetermined temperature resulting in plastic flow of the thermoplastic material in which it is inserted. This method of installing the fastener 20 in thermoplastic also relieves stresses created in the thermoplastic material by the advancing insertion of the fastener 20 therein resulting in preventing crack propagation. Preferably, the surface coating 34 is comprised of a material having a predetermined effective Curie temperature, and the predetermined frequency of the energy applied to the fastener 20 is selected to cause the surface coating 34 to heat to its effective Curie temperature.

Once the fastener 20 has been inserted into the thermoplastic workpiece 44 to a desired depth, the energy from source 46 is removed from the fastener 20 whereupon the plastically flowing material immediately surrounding the threads 26 sets up rather quickly due to the rapid dissipation of heat from the surface coating 34 through the thermoplastic workpiece 44. However, energy from source 46 may be removed before the fastener 20 is completely inserted with residual heat of the fastener being adequate to maintain material flow for complete insertion. The fastener 20 of the present invention engaged with a workpiece by the method of the present invention is securely retained or embedded in the workpiece 44 and is not easily removable therefrom unless and until an energy source 46 is applied thereto for removal of the fastener 20 from the workpiece 44. As shown in FIG. 4 the plastic material of the workpiece flows into the areas between the threads 26.

Figure 5:
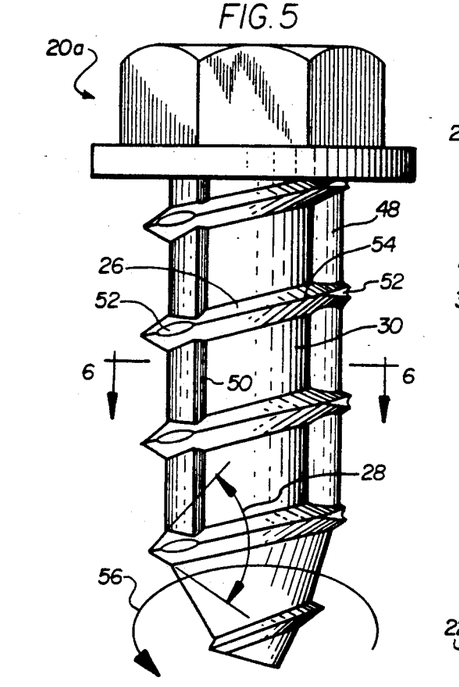
FIG. 5 is a side elevation view of a fastener having a head portion and a threaded shank portion with radially outwardly extending ramp-like ratchet teeth formed between turns of the thread.
Figure 6:
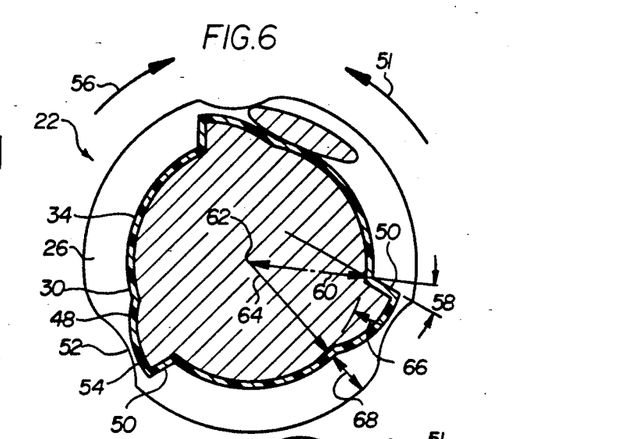
FIG. 6 is a cross-sectional view of the fastener taken along line 6—6 in FIG. 5 further illustrating a coating applied to the outer surface of the threaded shank.
Figure 9:
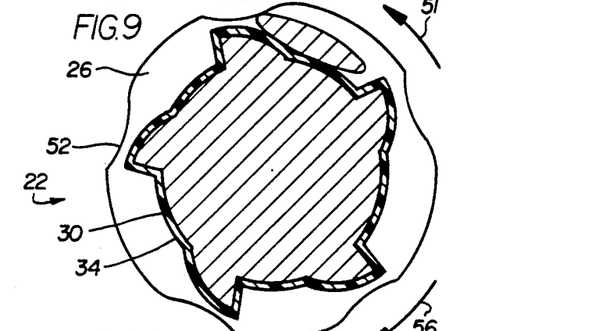
FIG. 9 is a cross-sectional view similar to FIG. 6 illustrating an alternative ratchet tooth configuration.

As shown in FIG. 5 and with reference to the cross sections in FIGS. 6 and 9, a fastener 20a is formed with at least one radially outwardly extending ramp-like ratchet tooth 48 extending from the unthreaded surface portion 30. Each such tooth 48 extends generally vertically between adjacent turns of the thread 26 formed on the threaded shank portion 22. As shown in FIGS. 6 and 9, each tooth 48 has a tooth face 50 oriented on the tooth 48 for resisting rotation in a direction for removal (as indicated by arrow 51) of the fastener 20a from the workpiece 44. As a result of formation of the teeth 48, underfill areas 52 are formed in thread crest 54, which underfills 52 are abutted by a tooth 48 on either side or both sides thereof. The thread crest 54 as shown in FIG. 6 follows an undulating pattern with the underfills 52 being formed in the crest generally adjacent each tooth 48. The underfills 52 help in thread forming and relieving stress in the workpiece material by enhancing radial inward flow of material. The pressure of the teeth 48 causes inward displacement of the heated material forcing it into the underfills 52 and toward the unthreaded shank 30 of the fastener 20a thus enhancing the degree of contact between the fastener 20a and the workpiece.

As shown in FIG. 6, an insertion rotation direction is indicated by arrow 56 and the tooth face 50 is formed on the side of the tooth 48 opposite the direction of rotation 56. A tooth face angle 58 is defined by an angle relative to a radius 60 extending from a center 62 of the fastener 20a intersecting the point on the unthreaded surface portion 30 which the tooth face 50 intersects. Each tooth 48 extends from a root radius 64 a radial projection distance 66 from between substantially on the order of 1/5 to substantially on the order of ½ of a thread depth 68 of the thread 26.

Figure 7:
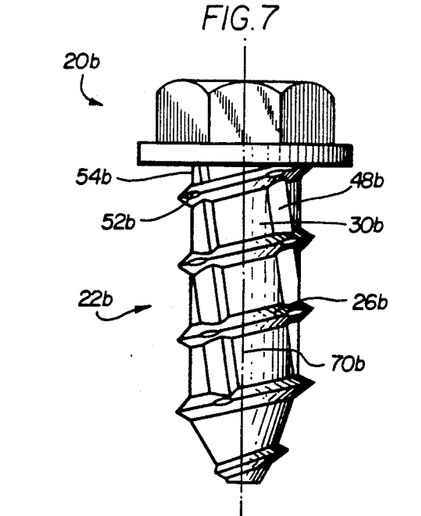
FIG. 7 is a side elevation view of a fastener having a head portion and a threaded shank portion with radially extending ramp-like ratchet teeth, formed with a spiral relation to a central axis and between turns of the thread.
Figure 8:
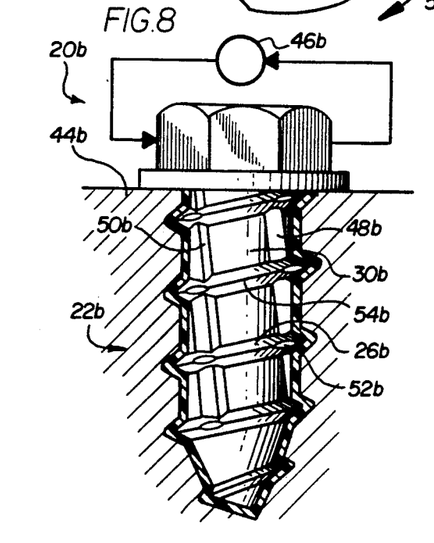
FIG. 8 is a side view of a fastener as shown in FIG. 7 installed in a workpiece with energy applied to the fastener as shown in FIG. 4 in which thermoplastic material has flowed around the threaded shank and ramp-like ratchet teeth of the fastener.

FIG. 7 shows a fastener 20b similar to the fastener 20a as shown in FIG. 5 in which the ramp-like ratchet teeth 48b are formed at a slope or spiral orientation to a central axis 70b. Similar to the teeth 48 as illustrated in the cross section of FIG. 6, underfill areas 52b are formed on the thread crest 54b adjacent the teeth 48b. FIG. 8 provides a view of the fastener 20b formed with the teeth 48b which has been inserted into a workpiece by employing the Curie effect in driving the fastener 20b into the workpiece. FIG. 9 provides a cross-sectional view of a shank portion 22 of a fastener which has been formed with five generally equally spaced-apart teeth 48.

The dimensions used in forming the thread-forming fasteners 20a, 20b are adaptable for a particular type of thermoplastic material or a range of thermoplastic materials. For example, the radial projection distance 66 of the tooth 48, and the crest angle 28 are chosen depending on the characteristics of the thermoplastic material such as hardness. A goal of the present invention is to reduce the driving torque, increase plastic flow of the thermoplastic material around the threads 26 and the teeth 48 and to relieve residual stresses in the workpiece once the fastener 20, 20a, 20b is inserted therein. The present invention achieves this goal and additionally provides a fastener 20a, 20b which is securely locked into the workpiece until and unless force is deliberately applied thereto for removal. The teeth 48 prohibit rotation of the fastener 20 thereby resisting removal and prohibit operation of the threads 26 which results in increased pull-out resistance of the threads 26.

Another embodiment of the present invention including rolling dies for forming such a fastener 20c and the method of forming such a fastener 20c is shown in FIGS. 10–21.

Figure 10:
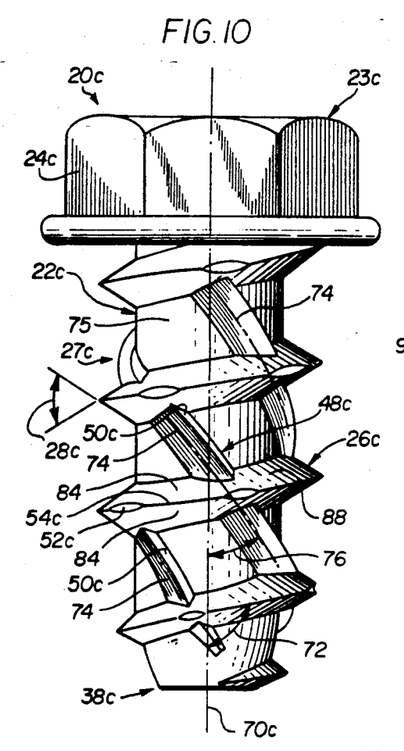
FIG. 10 is an elevational view of a fastener having a primary thread and multiple secondary threads intertwined therewith, in accordance with another embodiment of the present invention.
Figure 11:
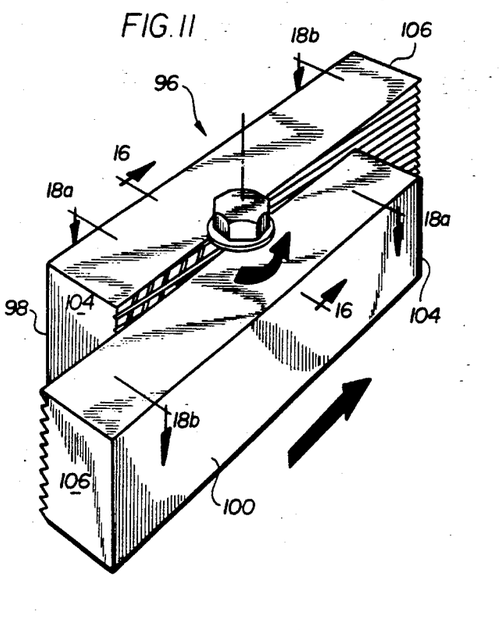
FIG. 11 is a perspective view illustrating the manner in which the primary and secondary threads are produced by rolling a fastener blank between complementary rolling dies.

FIGS. 10, 18a, 18b, 19 and 21 show a threaded fastener 20c having multiple thread forms disposed thereon. The fastener 20c has a shank 22c with a central axis 70c extending therethrough. A driving end 23c including a head portion 24c is formed on one end of the fastener 20c distal a work entering end 38c. The multiple thread forms include a single primary thread 26c disposed along the shank 22c at a primary thread inclination angle 72 (measured relative to the central axis 70c). The primary thread 26c is a continuous, helically disposed, thread form. At least one and preferably multiple secondary threads 27c are disposed on the shank 22c intertwined with the primary thread 26c. As shown in FIG. 10, three secondary threads 27c are spaced apart in respective helical paths 74 around the shank 22c. Each of the secondary threads 27c define a series of ramp-like ratchet teeth or thread segments 48c. The thread segments 48c are oriented along the helical path 74 and located in the spaces 75 defined between neighboring turns or convolutions of the primary thread 26c. The helical path 74 of each secondary thread 27c is disposed along the shank 22c at a secondary thread inclination angle 76 of approximately 45°. The secondary thread inclination angle 76 may range from 15° to 60°.

FIG. 10 illustrates a preferred arrangement and orientation of the thread segments 48c relative to the primary thread 26c. Importantly, the helix angle or pitch direction of secondary threads 27c is opposite that of primary threads 26c. That is, the two threads are "opposite handed". The secondary thread segments 48c are helically disposed around the shank 22c such that neighboring thread segments 48c are not directly axially aligned. In other words, the thread segments 48c disposed in neighboring spaces 75 do not have an axial correspondence because of their overall helical arrangement. Staggering of the thread segments 48c increases the peripheral engagement of the primary and secondary thread segments 26c, 27c with the workpiece material results in increased holding strength and the prevention of broaching of the workpiece material.

Figures 18A, 18B:
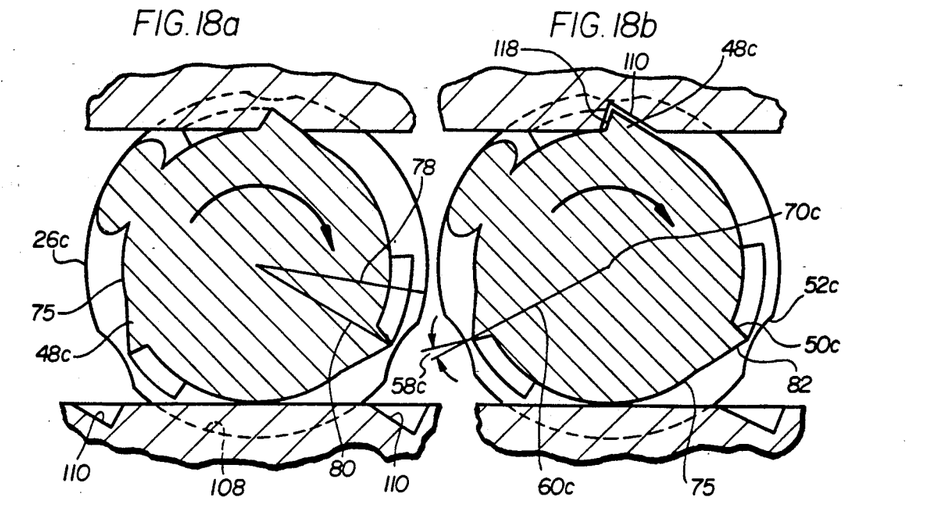
FIGS. 18a and 18b show a partial fragmentary cross-sectional top plan view of the fastener blank being rolled between rolling dies and in which the formed secondary thread is protected by enlarged secondary thread grooves.
Figure 19:
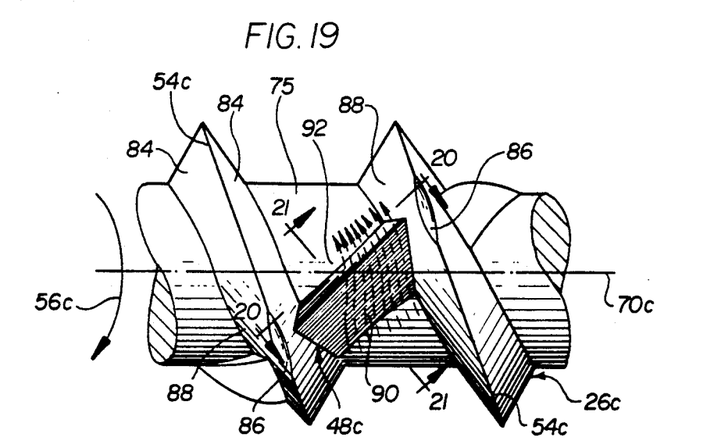
FIG. 19 is a diagrammatic representation of a section of the fastener as shown in FIG. 10 illustrating material movement facilitated by a thread segment of the secondary thread form to provide enhanced contact with a load-bearing thread flank of the primary thread.
Figure 20:
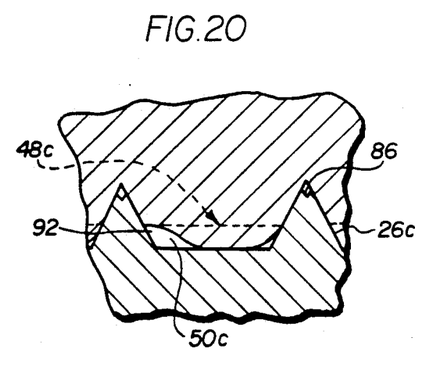
FIG. 20 is a cross-sectional view taken along line 20—20 in FIG. 19 which shows material which has flowed over the thread segment and engages the face of the thread segment.
Figure 21:
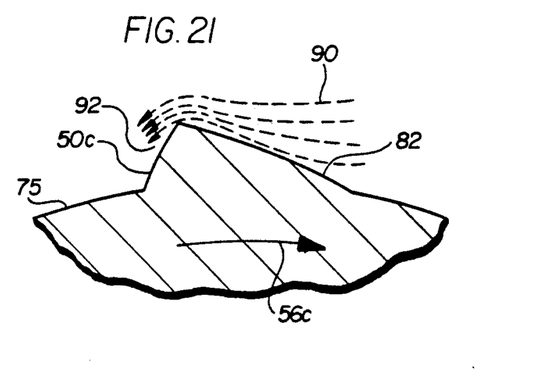
FIG. 21 is a diagrammatic partial fragmentary cross-sectional view taken along line 21—21 in FIG. 19 diagrammatically showing movement of material over the thread segment.

Enlarged illustrations of the primary and secondary threads 26c,27c are shown in FIGS. 18a through 21. As best shown in FIGS. 18a and 18b, a peripheral dimension of radius 78 of the primary thread 26c is greater than a peripheral dimension of radius 80 of the secondary thread 27c. Similar to the view of the first embodiment as shown in FIG. 6, FIGS. 18a and 18b show a cross-sectional view of the shank 22c taken perpendicular to the central axis 70c. Each of the thread segments 48c has a sloped ramp face or a lead face 82 which generally smoothly blends into the outer surface of the fastener at its root diameter at a corresponding space 75. A second side of the thread segment 48c is formed with a steeper trailing face or a secondary thread face 50c. A steeper angle is formed on the trailing face 50c to resist retrograde motion of the fastener once it is installed in a workpiece. FIG. 21 shows an enlarged view of a cross-section of a thread segment 48c. As shown in FIG. 21, the lead face 82 and the trailing face 50c may actually be slightly curved as a result of the rolling action by which the thread segments 48c are formed on the shank 22c.

As clearly shown in FIGS. 18a, 18b and 19, the primary thread 26c terminates in a thread crest 54c formed at a crest angle 28c. The primary thread 26c is a conventional thread form in that it is composed of two sloped flank portions 84 which extend radially outwardly from the shank 22c and angle inwardly to form the thread crest 54c. However, the primary thread 26c has a series of truncated portions 86 are formed on and periodically spaced along the thread crest 54c. Each truncated thread portion 86 forms a scooped or scalloped depression in the thread crest 54c generally in the area where ends of the secondary thread segments 48c intersect a corresponding flank 84 of the primary thread 26c. The truncated thread portions 86 facilitate thread forming, relieve material stress, and promote elastic flow of material of a workpiece over the thread segments 48c during driving of the fastener into a workpiece. Torque and resultant radial compressive forces are concentrated at the truncated thread portion 86 to enhance this material flow onto a load-carrying flank portion 88, during fastener insertion.

Other features and advantages of the structure described above with reference to FIGS. 10, 18a and 18b will be described more fully by way of reference to FIGS. 19-21. The illustrations in FIGS. 19-21 are generally diagrammatic in order to show the interaction of the structures with the surrounding workpiece material without having to show substantial phantom line representations. For example, material flowing over the thread segment 48c is shown in FIGS. 19 as a series of broken-line arrows 90. These material flow arrows 90 are provided to illustrate generally the directional flow of material with respect to the structures of the fastener 20c.

When a fastener is driven in a direction of rotation 56c as shown in FIGS. 19 and 21, material flow 90 over the thread segment 48c smoothly progresses over the lead face 82. The angular orientation of the thread segment 48c (as shown in FIG. 19) tends to direct or chase the material flow 90 towards the load carrying flank portion 88. The location of the truncated thread portion 86 combined with the directing or chasing action of the thread segment 48c results in a loading of material on the load-carrying flank portion 88. Material flowing over the lead face 82 generally flows into a void area 92 but may not necessarily completely fill the void area 92. During insertion, the staggered arrangement of the truncated thread portions 86 and the thread segments 48c tend to create pulsating radial forces which provide a ratchet-like action while the fastener 20c is driven.

Once a fastener 20c is installed in a workpiece, retrograde motion or counterrotation of the fastener can actually tend to tighten the fastener in the workpiece. Increased tightening on counterrotation is caused by the material resting against the load-carrying flank portions 88 and filling the void area 92 being forced against the steep trailing face 50c. With reference to FIGS. 18b and 21, it can be seen that the lead face 82 is formed to promote material flow 90 thereover while the steeper incline of the trailing face 50c is formed to prevent material flow thereover.

Attention is now also directed to FIGS. 11-17 which illustrate a set of rolling dies 96 and their employment to form the fastener as shown in FIG. 10. The rolling dies 96 operate in a known fashion, for example one of the dies 98 being stationary and the other die 100 being movable. As the movable die 100 is moved relative to the stationary die 98, with a fastener blank positioned therebetween, the fastener blank is compressively rotated to form the multiple threads 26c,27c on the shank 22c. Further details of the rolling dies 96 are shown in FIGS. 12-18b.

Figure 12:
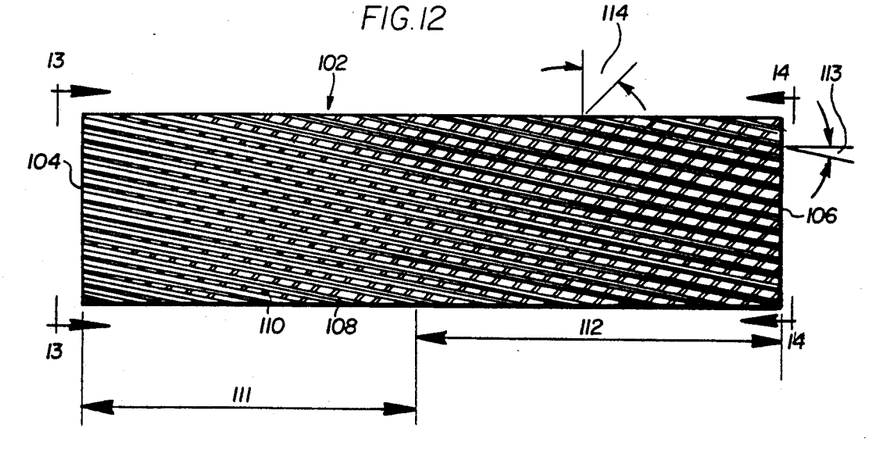
FIG. 12 is a front elevational view of a rolling face of the two complementary rolling dies.
Figure 13:
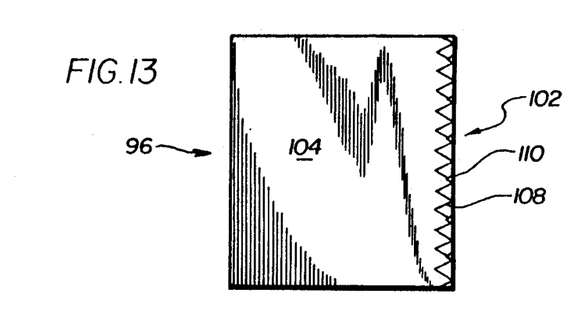
FIG. 13 is a side view of primary and secondary thread-forming grooves formed in the rolling face of one of the rolling dies as viewed from the entry end of the rolling die.
Figure 14:
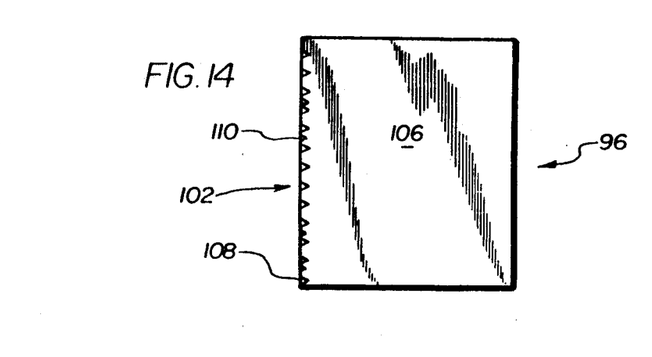
FIG. 14 is a side view of the primary and secondary thread-forming grooves shown in FIG. 13 as viewed from the exit end of the rolling die.

FIG. 12 provides a front elevational view of a rolling face 102 of one of the rolling dies 96. It should be noted that the rolling faces 102 of the rolling dies 98,100 are complementarily formed to cooperatively form a fastener from a fastener blank rolled therebetween. In this regard, the cross-sections of FIGS. 18a and 18b taken through the rolling dies 96 are staggered such that complementary portions of the rolling face 102 are found at opposing ends of the two dies 98,100. For example, a starting end 104 of the movable die 100 is positioned, prior to forming a threaded fastener, adjacent to the starting end 104 of the stationary die 98. A terminal end 106 of each die 98,100 is formed distal the starting ends 104.

The rolling face 102 of one of dies 96 shown in FIG. 12 shows primary thread-forming grooves 108 extending from the starting end 104 diagonally downwardly across the rolling face 102 towards the terminal end 106. The dimensions of the primary thread-forming grooves 108 decrease within a first section 111 the length of travel from the starting end 104 to the terminal end 106. For example, at the starting end 104 of the die 96 shown in FIG. 13, the primary thread-forming grooves 108 are deep, wide and angular, and adjacent grooves meet at the face 102. At the terminal end 106 shown in FIG. 14, the primary thread-forming grooves 108 are at the finished thread form and depth, compared to the starting end 104, and define intervening flat areas at face 102.

The secondary thread-forming grooves 110 are formed in the face 102 extending diagonally upwardly across the rolling face 102 from the starting end 104 towards the terminal end 106. The secondary thread-forming grooves 110 are non-coincident with and intersect the primary thread-forming grooves 108. The first section 111 of the secondary thread-forming grooves 110 is sized and dimensioned for progressively forming the secondary threads 27c as segments 48c between neighboring convolutions of the primary thread 26c. A second section 112 of the secondary thread-forming grooves 110 are sized and dimensioned to provide clearance for passively receiving and not further forming or affecting the thread segments 48c.

A lead or screw-thread helix angle 113 of the primary thread-forming grooves 108 defines the helical angle of the primary thread. A secondary thread angle 114 defines the helical angle of the multiple secondary threads 26c which are formed intertwined with the primary thread 26c. The lead angle and the secondary thread angle 112,114 are formed such that there are multiple secondary threads 26c and the helical arrangement of these threads is such as to prevent axial alignment of thread segments 48c.

Figure 15:
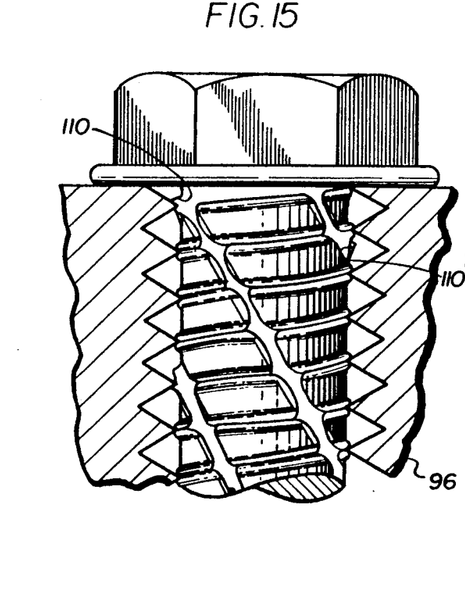
FIG. 15 is a partial fragmentary cross-sectional view of fastener blank between the rolling dies as shown in FIG. 11 at the initiation of primary and secondary thread forming showing the initial material displacement during the forming of primary and secondary threads.
Figure 16:
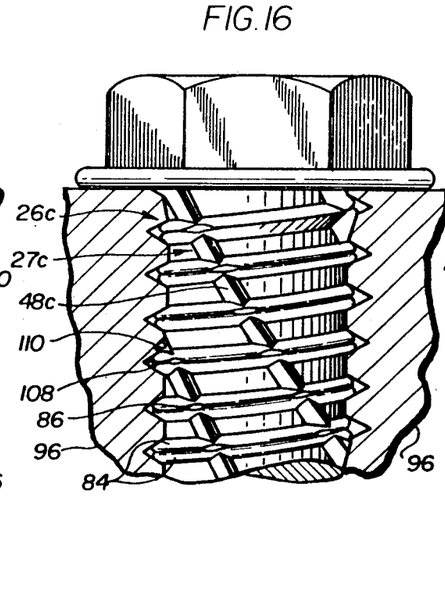
FIG. 16 is a partial fragmentary cross-sectional side view of the fastener as shown in FIG. 15 which has progressed approximately midway through the thread-forming operation in which the secondary thread is essentially fully formed and the primary thread is only partially formed.
Figure 17:
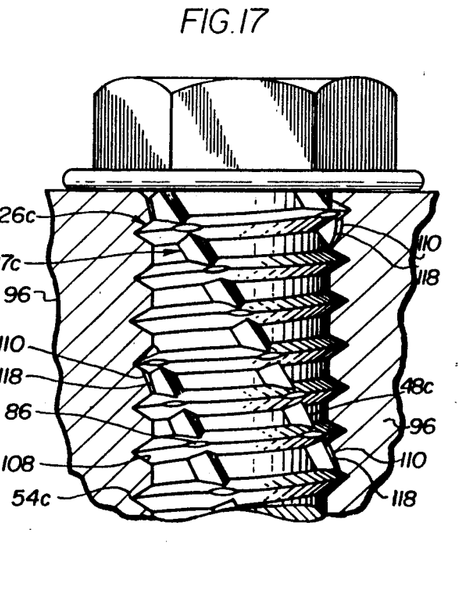
FIG. 17 is a partial fragmentary cross-sectional view of the fastener as shown in FIG. 15 in which the primary threads are completely formed and the secondary threads are protected during the final forming operation of the primary thread by oversized secondary thread-forming grooves.

The following discussion describes the method of making the fastener of the present invention employing the dies of the present invention as described hereinabove. Reference is directed to FIGS. 15-17. It should be noted that FIG. 16 shows a stage of formation of a fastener rolled between the dies 96 at a point similar to that shown in FIG. 11. FIGS. 15 and 17 show the fastener at points in the rolling before and after the point shown in FIG. 16, respectively.

FIG. 15 shows a fastener in which the thread-forming process has been initiated just after a fastener blank has been placed between the rolling faces 102 of the complementary rolling dies 96 generally towards the complementary starting ends of the dies 96. FIG. 15 shows the initial material displacement which occurs during the formation of the primary thread 26c and of the secondary thread 27c. Both the primary thread-forming grooves 108 and the secondary thread-forming grooves 110 are shown. The secondary threads 27c are more refined at the stage of forming shown in FIG. 15 than the primary threads.

As shown in FIG. 16, the formation of thread segments 48c comprising the secondary threads 27c is completed within the first section 111 (see FIG. 12) of the thread-rolling die 96. The formed thread segments 48c no longer engage the secondary thread-forming grooves 110 in the second section 112 of the thread-rolling die 96. Formation of the primary threads 26c has progressed in section 111 such that the flanks 84 are identifiable on the thread form 26c. Additionally, the truncated thread portions 86 remain on the thread crest 54c at the location where the thread segments 48c abut the flanks 84.

FIG. 17 shows the fastener near the completion of the forming operation. FIG. 17 shows the fastener near the terminal ends 106 of the rolling dies 96. As shown in FIG. 17, the primary threads are continued to be formed to the point that they are now complete primary threads 26c. In the second section 112 of the face 102, the secondary thread-forming grooves 110 are sized and dimensioned to passively receive the secondary threads 27c. Because of the conflicting demands of the rolling diameters of the two threads 26c,27c, a mismatch between the two occurs in the die. This mismatch becomes more pronounced as the fastener progresses along the dies in the rolling operation. The primary thread formation controls the position and rotation of the fastener relative to the dies. Accordingly, a rolling diameter mismatch will begin to occur between grooves 110 and the already formed secondary threads 27c. This mismatch increases as the fastener advances relative to the dies. In order to prevent deformation or destruction of the secondary thread 26c due to the mismatch, the grooves 110 are enlarged in the portion 112 of the die to allow for the mismatch and permit the secondary thread 26c to pass through grooves 110 freely in section 112.

Thus, formation of the secondary threads 27c preferably takes place substantially only within the first section 111. The second section 112 of the rolling face 102 must prevent conflicting deformation of the secondary threads as the primary threads continue to be formed. As shown in FIG. 17, a gap or clearance area 118 is defined between the secondary thread-forming groove 110 and the thread segment 48c.

Stated somewhat more technically, the screw blank, inserted between the dies 96, will travel a distance of $pi \times d$, per revolution where d is equal to the thread blank diameter of the secondary thread 26c. The distance of travel is approximately equal to the length of the first section 111 of the rolling faces 102. This secondary thread blank diameter d is predominant in controlling the rolling operation in the first section 111. The primary thread 26c is only partially formed in the first section 111 of the dies 96, and as such, the secondary thread 27c is of predominant concern. Partial formation of the primary thread 26c (see FIG. 15) in the first section 111 allows the shank material which forms the primary thread 26c to be displaced within the primary thread-forming grooves 108 slightly out of its final thread pitch lateral match as the thread-forming process approaches the second section 112.

In the general region where the first section 111 and the second section 112 meet, depending on the blank rolling length differences between the primary and secondary threads 26c,27c, the secondary thread die grooves 110 are proportionally enlarged to passively accommodate axial movement of the as-formed secondary thread segments 48c to prevent damage to the segments. The enlarged secondary thread die grooves 110 allow the partially formed primary thread 26c to assume control of rolling the fastener 20c in the second section 112 over a rolling length of $pi \times D$, where D is equal to the blank diameter of the primary thread 26c. The distance of travel is approximately equal to the length of the second section 112. In the second section 112, the partially formed primary threads 26c are completed. The resultant divergence between the differing rolling diameters and rolling lengths of the primary and secondary threads 26c,27c and their respective roll die thread-forming grooves are thereby eliminated.

The method of forming a fastener 20c of the present invention requires placing a fastener blank between two complementary rolling dies 96 and moving the dies to perform a rolling operation on the fastener blank. During the rolling operation, the formation of a primary thread 26c is initiated generally simultaneously with the initiation of formation of multiple secondary threads 27c which will ultimately be intertwined with the primary thread 26c (FIG. 15). The formation of the secondary thread 27c is completed before the primary thread 26c is completed (FIG. 16). Thereafter, the secondary thread 27c is protected by providing oversized secondary thread-forming grooves 110 for the remainder of the distance of the rolling face over which the fastener blank travels during the forming operation (FIG. 17). As the operation continues, the secondary threads 27c are protected and the primary thread 26c continue to be filled to the point that a final finished primary thread 26c is formed (FIG. 17).

While a particular embodiment of the present invention has been shown and described in detail herein, it may be obvious to those skilled in the art that changes and modifications of the present invention, in its various aspects, may be made without departing from the invention in its broader aspects, some of which changes and modifications being matters of routine engineering or design, and others being apparent after study. As such, the scope of the invention should not be limited by the particular embodiment and specific construction described herein, but should be defined in the appended claims and equivalents thereof. Accordingly, the aim of the appended claims is to cover all such changes and modifications as fall within the true spirit and scope of the invention.

The invention is claimed as follows:

1. A fastener including a shank having a central axis extending therethrough, a driving end, a workpiece entering end, and threads disposed thereon for engaging a workpiece and resisting retrograde motion once said fastener is installed in a workpiece, said fastener comprising:

a primary thread and at least one secondary thread, said primary thread having one of a left or right handed thread orientation and said secondary thread being formed in a thread orientation opposite said primary thread;

said primary thread being continuous and helically disposed on said shank, an outer diameter of said primary thread being greater than that of said secondary thread;

said secondary thread defining thread segments disposed on said shank between neighboring convolutions of said primary thread, said thread segments being positioned in a helical path at an angle for preventing broaching of said fastener out of a workpiece when tensioning forces are applied to said fastener.

2. A fastener as recited in claim 1, and further including truncated thread crest portions spaced along said primary thread proximate to said secondary thread segments for facilitating thread forming in a workpiece, relieving material stress and promoting elastic flow of material of a workpiece over said secondary thread segments.

3. A fastener as recited in claim 1, wherein said secondary thread is formed having a helix angle of approximately 45°.

4. A fastener as recited in claim 1, wherein two additional secondary threads of like configuration to said at least one secondary thread are formed generally symmetrically with said at least one secondary thread on said shank.

5. A fastener as recited in claim 4, wherein each of said thread segments of each of said secondary threads are positioned in a helical path inclined at an angle for preventing axial alignment of said secondary threads for preventing broaching of said fastener out of said workpiece when tensioning forces are applied to said fastener.

6. A fastener as recited in claim 1, each of said secondary thread segments including a sloped ramp face having a decreasing radial dimension in the direction of engaging rotation for facilitating threaded engagement of said fastener in a workpiece, and a steep trailing face intersecting said ramp face for resisting retrograde motion applied to said fastener.

7. A fastener including a shank having a shank axis extending therethrough, a driving end, a workpiece entering end, and threads disposed thereon for engaging a workpiece and resisting retrograde motion once said fastener is installed in a workpiece, said fastener comprising:

a continuous primary thread and at least one secondary thread intertwined therewith, said primary thread being one of a left or right handed thread orientation and said secondary thread being formed in a thread orientation opposite that of said primary thread;

said primary thread being helically disposed on said shank and having a greater outer diameter than that of said secondary threads;

said secondary thread including multiple thread segments disposed on said shank between neighboring convolutions of said primary thread, said thread segments of said secondary thread defining a helical path along said shank.

8. A fastener as recited in claim 7, further including truncated thread portions periodically spaced along said primary thread proximate to said secondary thread segments for facilitating thread forming, relieving material stress, and promoting elastic flow of material over said secondary thread segments.

9. A fastener as recited in claim 7, wherein said primary and secondary threads are formed at respective primary and secondary helix angles, said secondary helix angle having an angular measurement of between 30° and 60°, and said primary helix angle being less than 30°.

10. A fastener as recited in claim 7, said primary thread further including load carrying flanks positioned proximate to each of said thread segments, said secondary thread being inclined relative to said primary thread for creating a plowing action to deflect workpiece material over said thread segment and toward a corresponding load carrying flank of said primary thread.

11. A fastener as recited in claim 7, in which said fastener is a thread forming fastener and said primary threads are thread forming threads.

12. A fastener including a shank having a central axis extending therethrough, a driving end, a workpiece entering end, and thread forms disposed thereon for engaging a workpiece and resisting retrograde motion once said fastener is installed in a thermoplastics workpiece, said fastener comprising:

a primary thread and at least two secondary threads intertwined therewith, said primary thread having one of a left or right handed thread orientation and said secondary threads being formed in a thread orientation opposite said primary thread;

said primary thread being continuous and helically disposed on said shank between said driving end and said workpiece entering end and having a greater peripheral dimension than each of said secondary threads, neighboring convolutions of said primary thread defining a shank surface therebetween at a root diameter;

each of said secondary threads comprising multiple thread segments located on said shank surfaces between said primary thread convolutions, each of said thread segments of each of said secondary threads defining a helical path which is inclined at an angle for alternating positions of said thread segments of said secondary threads for preventing axial alignment of said thread segments to prevent broaching of said fastener out of said thermoplastic workpiece when tensioning forces are applied to said fastener.

13. A fastener according to claim 12 wherein an outer surface portion of said fastener has a coating having a preselected effective Curie temperature for heating said outer surface portion upon application of predetermined energy thereto during installation of said fastener into a thermoplastic workpiece for enhancing the plastic flow of the thermoplastic material in close proximity to said fastener during thread forming and for effectively reducing the required drive torque for thread forming by said fastener, while increasing stripping torque.

* * * * *